(12) United States Patent
Taniguchi

(10) Patent No.: US 10,464,375 B2
(45) Date of Patent: Nov. 5, 2019

(54) MOTORCYCLE TIRE

(71) Applicant: Sumitomo Rubber Industries, Ltd., Kobe-shi, Hyogo (JP)

(72) Inventor: Toyoto Taniguchi, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 88 days.

(21) Appl. No.: 15/009,184

(22) Filed: Jan. 28, 2016

(65) Prior Publication Data

US 2016/0229230 A1 Aug. 11, 2016

(30) Foreign Application Priority Data

Feb. 10, 2015 (JP) .................................. 2015-024413

(51) Int. Cl.
*B60C 11/03* (2006.01)
(52) U.S. Cl.
CPC ... *B60C 11/0302* (2013.01); *B60C 2011/0346* (2013.01); *B60C 2011/0372* (2013.01); *B60C 2011/0374* (2013.01); *B60C 2200/10* (2013.01)
(58) Field of Classification Search
CPC ............. B60C 11/0332; B60C 11/0302; B60C 11/0306; B60C 2011/0334; B60C 2011/0346; B60C 2011/0372; B60C 2011/0374; B60C 2200/10
USPC ....................................... 152/209.18, 209.11
See application file for complete search history.

(56) References Cited

U.S. PATENT DOCUMENTS

| | | | | |
|---|---|---|---|---|
| 6,220,320 | B1 * | 4/2001 | Nakagawa | .......... B60C 11/0302 152/209.11 |
| D564,441 | S * | 3/2008 | Itoi | ............................. D12/534 |
| 2006/0219342 | A1 | 10/2006 | Steinbach | |
| 2011/0132509 | A1* | 6/2011 | Kasai | .................. B60C 11/0083 152/209.18 |

(Continued)

FOREIGN PATENT DOCUMENTS

| | | |
|---|---|---|
| EP | 2851210 A1 | 3/2015 |
| JP | 2007-506590 A | 3/2007 |
| WO | WO 2005005169 A1 * | 1/2005 ......... B60C 11/0302 |

OTHER PUBLICATIONS

Extended European Search Report, dated Jun. 21, 2016, for European Application No. 16152208.1.

*Primary Examiner* — Matthew J Daniels
*Assistant Examiner* — Yunju Kim
(74) *Attorney, Agent, or Firm* — Birch, Stewart, Kolasch & Birch LLP

(57) ABSTRACT

A motorcycle tire includes a tread portion provided with a zigzag central main groove, first lateral grooves, second lateral grooves and shoulder grooves. The central main groove includes first inclined elements each with a first angle, second inclined elements each with a second angle in an opposite direction to the first inclined elements, and corners each between first and second elements and located within a crown region. Each first lateral groove extends from each corner with a third angle not less than the first and second angles. Each second lateral groove extends from one of the first and second inclined elements in an opposite direction to the first or second inclined element to which the second lateral groove is connected. Each shoulder groove is disposed outside the crown region and is connected to one of the second lateral grooves.

9 Claims, 3 Drawing Sheets

(56) References Cited

U.S. PATENT DOCUMENTS

2011/0162769 A1* 7/2011 Mariani ............... B60C 3/04
  152/209.18
2015/0083294 A1* 3/2015 Nakagawa .......... B60C 11/0306
  152/209.11

* cited by examiner

MOTORCYCLE TIRE

BACKGROUND OF THE INVENTION

Field of the Invention

The present invention relates to motorcycle tires, and in particular, relates to a motorcycle tire capable of improving wet road performance as well as handling performance.

Description of the Related Art

Conventionally, motorcycle tires having a tread portion provided with a plurality of grooves have been proposed. These grooves of the tread portion can evacuate water from under the tread portion outwardly to maintain wet traction. On the other hand, these grooves may cause the deterioration of tread rigidity that may offer undesirable handling performance of the tire during cornering.

Japanese Translation of PCT International Application Publication No. JP-T-2007-506590 discloses a motorcycle tire having an improved groove arrangement that includes a circumferentially extending main groove arranged in a central region and a plurality of lateral grooves each extending axially outwardly from the central region and arranged in a staggered manner, in order to improve wet performance during cornering.

Unfortunately, the motorcycle tire disclosed by the above publication has a problem regarding handling performance, and in particular, the motorcycle tire tends to have non-linear property of ground-contacting feeling according to change of the camber angle.

SUMMARY OF THE INVENTION

In view of the above problems in the conventional art, the present invention has an object to provide a motorcycle tire capable of improving wet road performance as well as handling performance during cornering.

According to one aspect of the present invention, a motorcycle tire includes a tread portion having a designated rotational direction and an arc-shape outer surface protruding radially outwardly. The tread portion is provided with a circumferentially and continuously extending central main groove in a zigzag shape, a plurality of first lateral grooves arranged on both sides of the central main groove, a plurality of second lateral grooves arranged on both sides of the central main groove, and a plurality of shoulder grooves arranged on both sides of the central main groove. The central main groove includes a plurality of first inclined elements across a tire equator having a first angle with respect to a circumferential direction of the tire, a plurality of second inclined elements across the tire equator having a second angle with respect to the circumferential direction of the tire in an opposite direction to the first inclined element, and a plurality corners each between one of the first elements and one of the second elements, wherein each corner is located within a crown region that comes into contact with a ground when the tire is mounted on a standard rim with a standard pressure and is loaded with a standard tire load at a camber angle of zero. Each first lateral groove extends axially outwardly toward the rotational direction from one of the corners of the central main groove. Each first lateral groove has a third angle with respect to the circumferential direction of the tire, and the third angle is greater than or equal to the first and second angles. Each second lateral groove extends axially outwardly toward the rotational direction from one of the first inclined elements or one of the second inclined elements. Each second lateral groove is inclined in an opposite direction with respect to the first or second inclined element to which the second lateral groove is connected. Each shoulder groove is disposed outside the crown region and connected to one of the second lateral grooves.

In another aspect of the invention, the first angle and the second angle may be not more than 40 degrees.

In another aspect of the invention, in a groove centerline of the central main groove, said each corner may be located within axially both outermost regions when quartering the crown region in an axial direction of the tire.

In another aspect of the invention, the third angle may be greater than the first angle and the second angle.

In another aspect of the invention, one of the second lateral grooves may be connected to the first or second inclined element on the tire equator.

In another aspect of the invention, one of the shoulder grooves may be inclined axially inwardly toward the rotational direction at an angle of not more than 40 degrees with respect to the circumferential direction of the tire.

In another aspect of the invention, the tread portion may further be provided with a first connection groove connecting between one of the first lateral grooves and one of the second lateral grooves.

In another aspect of the invention, the first connection groove may be inclined axially inwardly toward the rotational direction at an angle of not more than 40 degrees with respect to the circumferential direction of the tire.

In another aspect of the invention, tread portion may further be provided with a second connection groove connecting between the central main groove and one of the second lateral grooves.

In another aspect of the invention, the tread portion may further be provided with a second connection groove connecting between the central main groove and one of the second lateral grooves, and the second connection groove may be disposed so that the first connection groove is continued to the second connection groove through the second lateral groove.

In another aspect of the invention, each of the first lateral grooves may include an axially outer end located near a tread edge.

In another aspect of the invention, each of the second lateral grooves may include an axially outer end located near a tread edge.

DESCRIPTION OF THE EMBODIMENTS

An embodiment of the present invention will be explained below with reference to the accompanying drawings.

Figure 1:
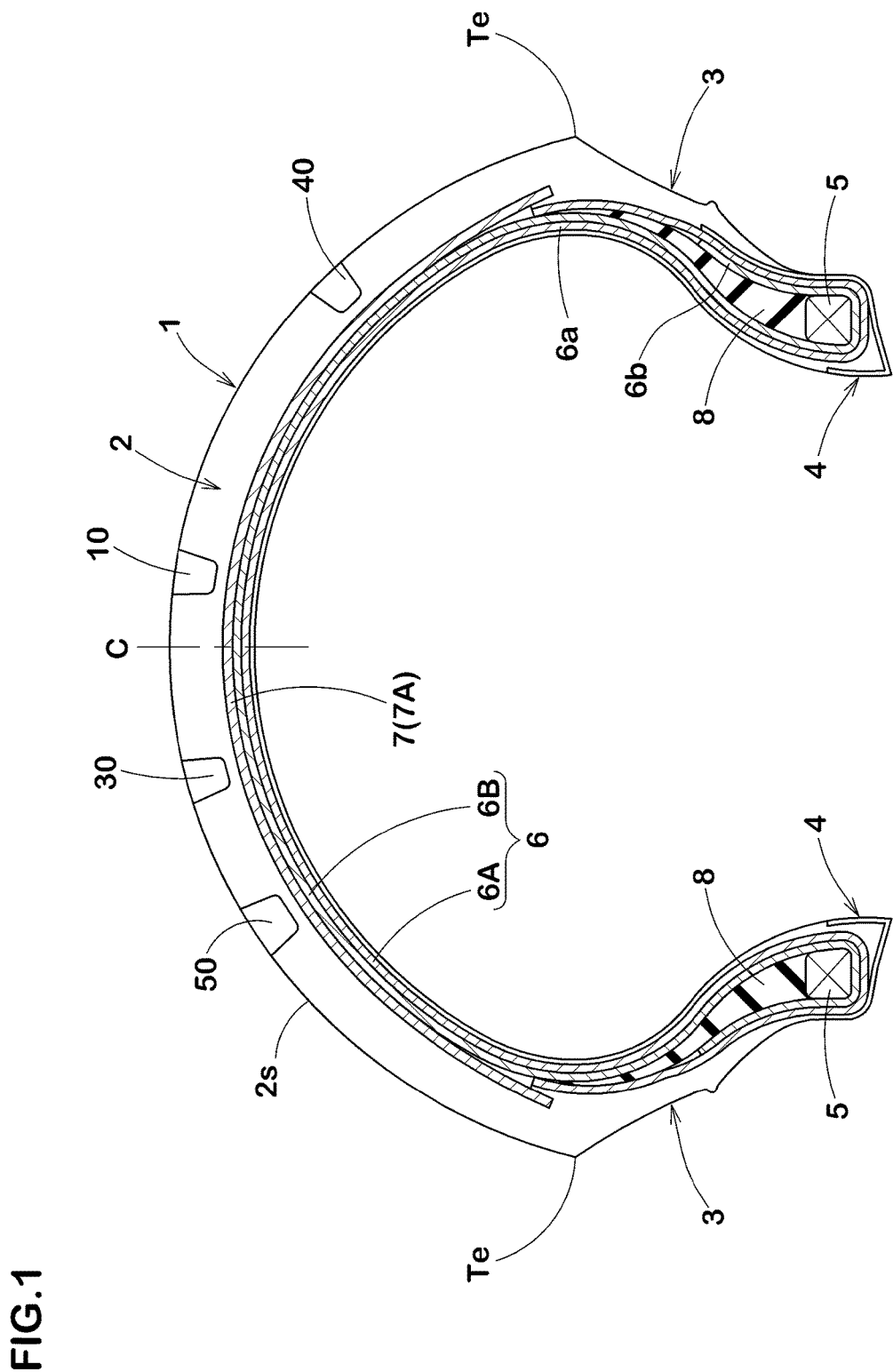
FIG. 1 is a cross-sectional view of a motorcycle tire according to an embodiment of the present invention.
Figure 2:
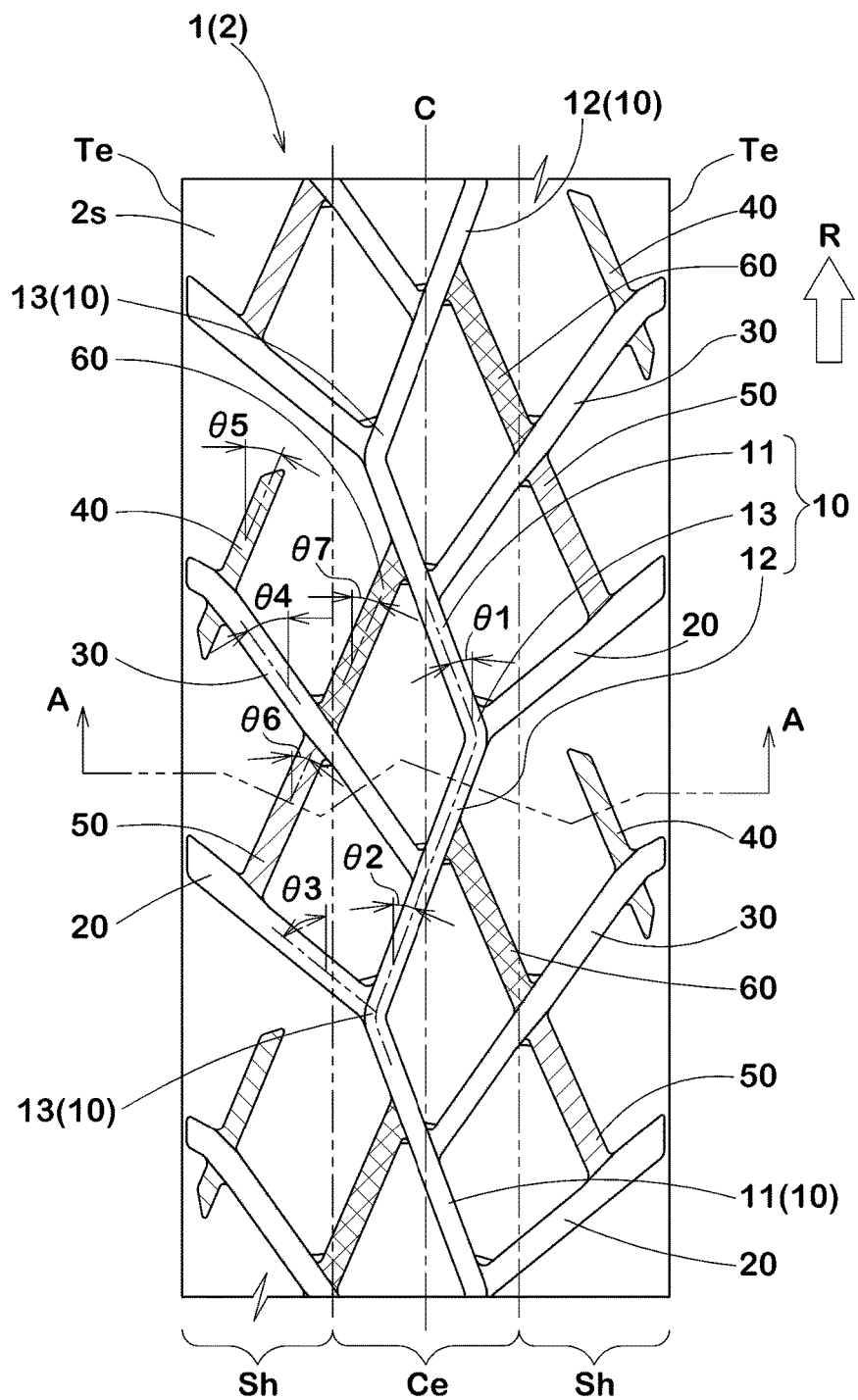
FIG. 2 is a development view of a tread portion illustrated in FIG. 1.

FIG. 1 illustrates a cross-sectional view of a motorcycle tire 1 under a standard condition in accordance with an embodiment of the present invention. The motorcycle tire 1, for example, is configured as a tire that is suitably used for traveling on paved road. FIG. 2 illustrates a development view of a tread portion 2 of the tire 1. FIG. 1 corresponds to a cross section taken along a line A-A of FIG. 2.

As used herein, the standard condition is such that the tire 1 is mounted on a standard rim (not shown) with a standard pressure but is loaded with no tire load. In this specification and claims, various dimensions, positions and the like of the tire 1 refer to those under the standard condition unless otherwise noted.

As used herein, the standard rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

The tire 1 in accordance with the present embodiment includes an arc-shape outer surface 2s of the tread portion 2 formed between tread edges Te and Te, and which protrudes radially outwardly. The tire 1 may maintain sufficient ground contact area of the tread portion 2 during cornering even at a large camber angle.

The tire 1 includes a carcass 6 and a band layer 7.

The carcass 6 includes a main portion 6a extending between bead cores 5 disposed in each bead portion 4 through the tread portion 2 and a pair of sidewall portions 3, and a pair of turn-up portions 6b each turned up around the bead core 5 from axially inside to the outside of the tire in each bead portion 4.

In this embodiment, the carcass 6 includes two carcass plies 6A and 6B of cords. These two carcass plies 6A and 6B are arranged so that carcass cords of each ply cross one another. The carcass cords, for example, are oriented at an angle of from 75 to 90 degrees with respect to the tire equator C. For the carcass cords, an organic fiber cord such as nylon, polyester, rayon and the like may be used, for example.

A bead apex component 8 is disposed between the main portion 6a and the turn-up portion 6b in each bead portion 4. The bead apex component 8 is made of a rubber having a high hardness and extends radially outwardly from the bead core 5 in a tapered shape.

The band layer 7 is disposed radially outward of the carcass 6 in the tread portion 2. The band layer 7 includes at least one band ply 7A of cords. In this embodiment, the band ply 7A is configured as a full band ply covering the entire width of the tread portion 2. The band layer 7 may reinforce the entire tread portion 2 firmly by its hoop effect so that cornering performance as well as high speed stability can be improved. The band cords, for example, are oriented at an angle of not more than 5 degrees with respect to the circumferential direction of the tire. For the band cords, an organic fiber cord with a high modulus such as nylon, rayon and the like may be used, for example.

As illustrated in FIG. 2, the tire 1 in accordance with the present embodiment has a designated rotational direction R in order to maximize advantageous effects of the tread portion 2. The rotational direction R is indicated using a character or mark on the sidewall portion 3, for example.

The tread portion 2 includes the crown region Ce having a center corresponding to the tire equator C and a pair of shoulder regions Sh. The crown region Ce is a region that comes into contact with the ground when the tire 1 is mounted on the standard rim with the standard pressure and is loaded with a standard tire load at a camber angle of zero. Each shoulder region Sh is a region outside the crown region Ce and which is formed between the crown region Ce and one of the tread edges Te.

As used herein, the standard tire load is a tire load officially approved or recommended for the tire by standards organizations, wherein the standard load is the "maximum load capacity" in JATMA, the "Load Capacity" in ETRTO, and the maximum value given in the above-mentioned table in TRA or the like.

The tread portion 2 is provided with a circumferentially and continuously extending central main groove 10 in a zigzag shape within the crown region Ce. The central main groove 10 includes a plurality of first inclined elements 11, a plurality of second inclined elements 12, and a plurality of corners 13. Furthermore, the first inclined element 11 and the second inclined element 12 are alternately arranged in the circumferential direction of the tire.

Each first inclined element 11 extends across the tire equator C while being inclined at a first angle $\theta 1$ with respect to the circumferential direction of the tire. In FIG. 2, the first inclined element 11 is inclined downward to the right.

Each second inclined element 12 extends across the tire equator C while being inclined at a second angle $\theta 2$ with respect to the circumferential direction of the tire in an opposite direction to the first inclined element 11. In FIG. 2, the second inclined element 12 is inclined upward to the right. Furthermore, the Preferably, the first angle $\theta 1$ and the second angle $\theta 2$ are more than 0 degrees, but they are not more than 40 degrees. When the tire 1 has the first angle $\theta 1$ and the second angle $\theta 2$ being more than 40 degrees, the handling stability on straight traveling tends to be deteriorated. In particular, it may be difficult to obtain a quick response characteristic in handling. The first angle $\theta 1$ may be same as or different from the second angle $\theta 2$.

In this embodiment, the first inclined element 11 and the second inclined element 12 are formed as a straight shape. Alternatively, they may be formed as a curve shape. In the later case, the first angle $\theta 1$ and the second angle $\theta 2$ are identified using angles of tangents of the first inclined element 11 and the second inclined element 12, respectively.

Figure 3:
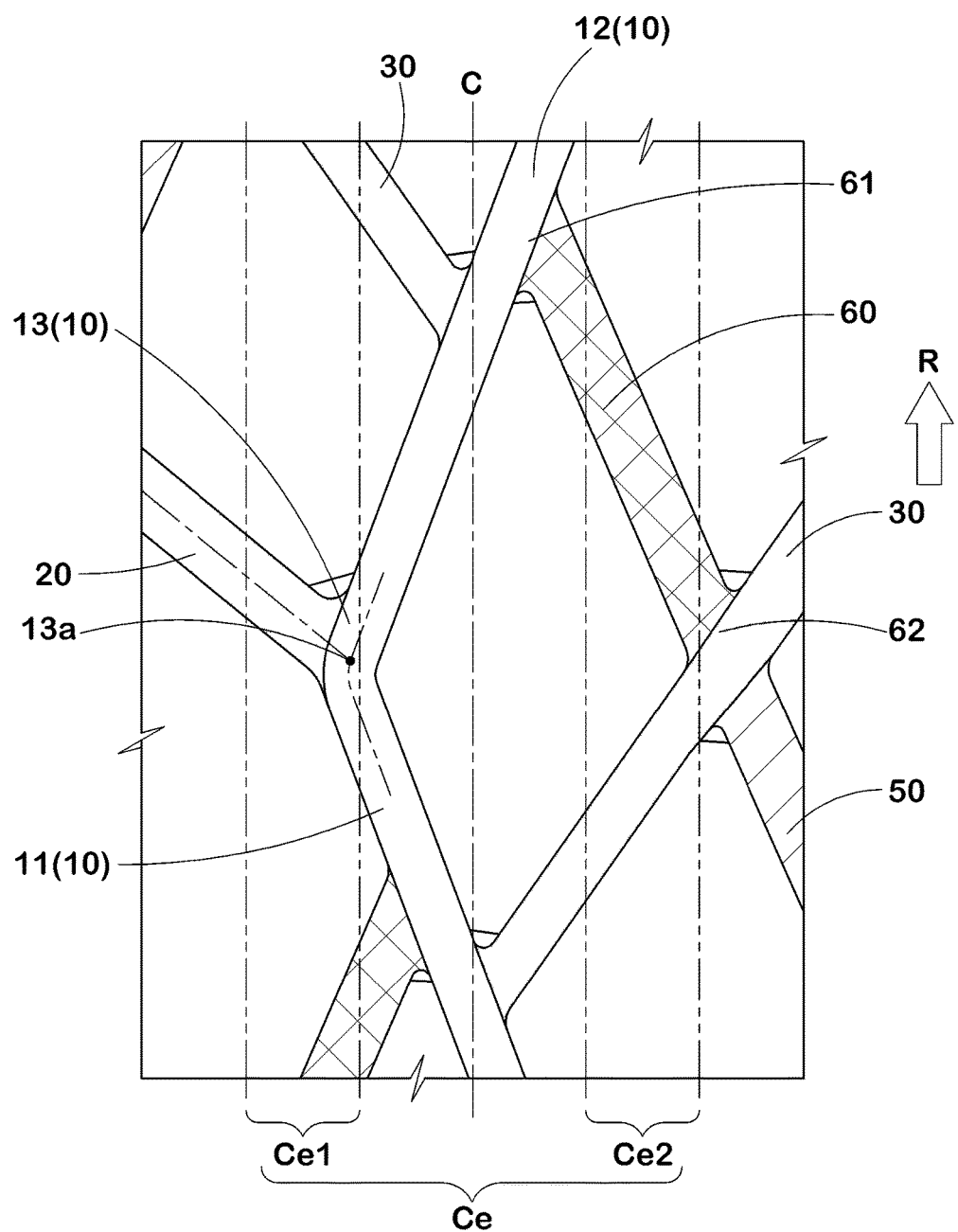
FIG. 3 is an enlarged view of the tread portion illustrated in FIG. 2.

FIG. 3 illustrates a partial enlarged view of the tread portion of FIG. 2. As illustrated in FIG. 3, each corner 13 of the central main groove 10 is located within the crown region Ce. Preferably, in a groove centerline illustrated by a one-dotted line of the central main groove 10, each corner 13a is located within axially both outermost regions Ce1 or Ce2 when quartering the crown region Ce in the axial direction of the tire. This configuration may improve transient characteristic of handling performance. As used herein, transient characteristic of handling performance of a tire is defined as a linearity of change in ground-contacting feeling with respect to change in the camber angle of the tire.

As illustrated in FIG. 2, the tread portion 2 is further provided with a plurality of first lateral grooves 20 arranged on both sides of the central main groove 10, a plurality of second lateral grooves 30 arranged on both sides of the central main groove 10 and a plurality of shoulder grooves 40 arranged on both sides of the central main groove 10. To help understand the configuration of the respective grooves, the first and second lateral grooves 20 and 30 are colored lightly, and the shoulder grooves 40 are displayed by hatching.

Each first lateral groove 20 extends axially outwardly toward the rotational direction R from one of the corners 13 of the central main groove 10. In this embodiment, the axially outer end of the first lateral groove 20 is located near the tread edge Te. Since each first lateral groove 20 extends from each corner 13 located within the crown region Ce, the groove arrangement located within the footprint of the tread portion 2 hardly changes at an initial stage of cornering with a small camber angle, and therefore the change in rigidity of the tread portion 2 coming into contact with the ground during the initial stage of cornering tends to be small. Thus, the transient characteristic of handling performance can be improved. Furthermore, the first lateral groove 20 may also improve wet performance during straight traveling as well as the initial stage of cornering.

Each first lateral groove 20 is inclined at a third angle $\theta 3$ with respect to the circumferential direction of the tire. The third angle $\theta 3$ is greater than or equal to the first and second angles $\theta 1$ and $\theta 2$. When the third angle $\theta 3$ is less than the first angle $\theta 1$ and the second angle $\theta 2$, the transient characteristic of handling performance at an initial stage of cornering may be deteriorated. Preferably, the third angle $\theta 3$ is greater than the first angle $\theta 1$ and the second angle $\theta 2$. More preferably, the third angle $\theta 3$ is in a range of from 30 to 80 degrees. When the third angle $\theta 3$ is less than 30 degrees, the transient characteristic of handling performance at an initial stage of cornering may be deteriorated. When the third angle $\theta 3$ is more than 80 degrees, handling performance at straight traveling may be deteriorated, and in particular it may be difficult to obtain a quick response in handling.

In this embodiment, each first lateral groove 20 is formed as a straight shape. Alternatively, each first lateral groove 20 may be formed as a curve shape. In the later case, the third angle $\theta 3$ is identified using an angle of the tangent of the first lateral groove 20.

Each second lateral groove 30 extends axially outwardly toward the rotational direction R from one of the first inclined elements 11 or one of the second inclined elements 12. In this embodiment, the axially outer end of the second lateral groove 30 is located near the tread edge Te. The second lateral groove 30 is inclined in an opposite direction with respect to the first inclined element 11 or the second inclined element 12 to which the second lateral groove 30 is connected.

Each second lateral groove 30 is inclined at a fourth angle $\theta 4$ with respect to the circumferential direction of the tire. Preferably, the fourth angle $\theta 4$ is more than 0 degree, but it is equal to or less than 45 degrees. When the fourth angle $\theta 4$ is more than 45 degrees, handling performance at straight traveling may be deteriorated, and in particular it may be difficult to obtain a quick response in handling.

Preferably, each second lateral groove 30 is connected to the first inclined element 11 or the second inclined element 12 on the tire equator C. Namely, the tire equator C passes through a crossing region where the second lateral groove 30 crosses the first inclined element 11 or the second inclined element 12 one another. As used herein, the crossing region is a groove overlap region when the second lateral groove 30 is extended into the first inclined element 11 or the second inclined element 12. Since the axially inner end of the second lateral groove 30 is located on the tire equator C, wet performance on straight traveling may be improved. Furthermore, each second lateral groove 30, for example, may be bent at near the tread edge Te to improve drainage performance during cornering with a large camber angle.

In this embodiment, each second lateral groove 30 is formed as a straight shape. Alternatively, each second lateral groove 30 may be formed as a curve shape. In the later case, the fourth angle $\theta 4$ is identified using an angle of the tangent of the second lateral groove 30.

Each the shoulder groove 40 is disposed within the shoulder region Sh, and is connected to one of the second lateral grooves 30 nearby the tread edge Te. The shoulder groove 40 may mitigate of rigidity of the shoulder region Sh of the tread portion 2. Accordingly, since rigidity change of the tread portion 2 during cornering with a large camber angle tends to be small, the transient characteristic of handling performance may be improved. Furthermore, the shoulder grooves 40 may improve drainage performance during cornering with a large camber angle to improve wet performance.

Preferably, each shoulder groove 40 is inclined at a fifth angle $\theta 5$ axially inwardly toward the rotational direction R in order to further improve wet performance during cornering with a large camber angle. Preferably, the fifth angle $\theta 5$ is in a range of not more than 40 degrees with respect to the circumferential direction of the tire. When the fifth angle $\theta 5$ is more than 40 degrees, the transient characteristic of handling performance may be deteriorated.

In this embodiment, each shoulder groove 40 is formed as a straight shape. Alternatively, each shoulder groove 40 may be formed as a curve shape. In the later case, the fifth angle $\theta 5$ is identified using an angle of the tangent of the shoulder groove 40. Although the shoulder groove 40 is connected to the second lateral groove 30 in a cross shape in this embodiment, it may be connected in a T-shaped manner.

In this embodiment, the tread portion 2 is further provided with a plurality of first connection grooves 50 and a plurality of second connection grooves 60 on axially both sides of the central main groove 10. To help understand the configuration of the first connection groove 50 and the second connection grooves 60, these grooves are identified using a different hatching in FIGS. 2 and 3.

Each first connection groove 50 is disposed within the shoulder region Sh. The first connection groove 50 connects between the first lateral groove 20 and the second lateral groove 30. The first connection groove 50 may mitigate rigidity of the shoulder region Sh to reduce rigidity change of the tread portion 2. Accordingly, the transient characteristic of handling performance may be improved during cornering with a large camber angle.

Preferably, each first connection groove 50 is inclined axially inwardly toward the rotational direction R at a sixth angle $\theta 6$. The first connection grooves 50 may improve drainage performance during cornering with a large camber angle. Preferably, the sixth angle $\theta 6$ is in a range of not more than 40 degrees with respect to the circumferential direction of the tire. When the sixth angle $\theta 6$ is more than 40 degrees, the transient characteristic of handling performance at a large camber angle may be deteriorated.

In this embodiment, each first connection groove 50 is formed as a straight shape. Alternatively, each first connection groove 50 may be formed as a curve shape. In the later case, the sixth angle $\theta 6$ is identified using an angle of the tangent of the first connection groove 50. Although the first connection groove 50 is connected to the first lateral groove 20 in a T-shaped manner in this embodiment, it may be connected in a cross shape manner.

As illustrated in FIG. 3, each second connection groove 60 includes one end connected to one of the first inclined elements 11 or the second inclined elements 12 of the central main groove 10 at a first junction 61 and the other end connected to one of the second lateral grooves 30 at a second junction 62. By providing the second connection grooves 60, the transient characteristic of handling performance at an initial stage of cornering may be improved.

Preferably, each of the first junctions 61 is located forwardly in the rotational direction R with respect to each junction of the central main groove 10 and one second lateral groove 30. Furthermore, each second junction 62 is preferably located at the same position as a junction of the first connection groove 50 and the second lateral groove 30. In this case, the second connection groove 60 is disposed so that the first connection groove 50 is continued to the second connection groove 60 through the second lateral groove 30. When the respective first connection groove 50 and the second connection groove 60 extend in a straight manner, the second connection groove 60 may be disposed so that the first connection groove 50 is continued to the second connection groove 60 through the second lateral groove 30 so as to form a straight line.

As illustrated in FIG. 2, each of the second connection grooves 60 is preferably inclined axially inwardly toward the rotational direction R at a seventh angle θ7 with respect to the circumferential direction of the tire. The second connection groove 60 may improve drainage performance at a small camber angle. Preferably, the seventh angle θ7 is in a range of not more than 45 degrees in order to improve quick response of handling performance from a straight traveling.

In this embodiment, each second connection groove 60 is formed as a straight shape. Alternatively, each second connection groove 60 may be formed as a curve shape. In the later case, the seventh angle θ7 is identified using an angle of the tangent of the second connection groove 60.

While the particularly preferable embodiments in accordance with the present invention have been described in detail, the present invention is not limited to the illustrated embodiments, but can be modified and carried out in various aspects.

EXAMPLE

Motorcycle tires with a basic structure illustrated in FIG. 1 and a basic tread pattern illustrated in FIG. 2 were manufactured, as a front wheel, based on details shown in Table 1. Then, handling performance of each tire was tested. For the handling performance, transient characteristic during cornering and the degree of quick response were evaluated. Common specifications of test tires and the test method are as follows. Note that it was confirmed that each test tire has had excellent wet performance on another test conducted prior to this test.

Motorcycle: Motorcycle for on-road with a displacement of 600 cc
Front tire size: 120/70 ZR17
Front tire internal pressure: 250 kPa
Test course: Loop course
Quick Response Test:

A test run was carried out on the test course and then a rider evaluated the degree of linearity of quick response of handling performance during cornering by his feeling while changing the camber angle of the motorcycle. The test results are shown in Table 1 using a score where Ref. 1 is set to 100. The larger the value, the better the performance is.

Transient Characteristic of Ground Contacting Feeling Test:

A test run was carried out on the test course and then a rider evaluated the degree of transient performance of ground contacting feeling during cornering by his feeling while changing the camber angle of the motorcycle. The test results are shown in Table 1 using an index where Ref. 1 is set to 100. The larger the value, the closer the linear transient characteristic is.

Test results are shown in Table 1. From the test results shown in Table 1, it was confirmed that the all test tires had excellent quick response of handling performance, but there was a difference between the reference tires and the example tires regarding the transient characteristic. Accordingly, it was confirmed that the example tires of the present embodiment have improved handling performance of quick response and transient characteristic while ensuring wet performance.

TABLE 1

|  | Ref. 1 | Ref. 2 | Ex. 1 | Ex. 2 | Ex. 3 | Ex. 4 |
| --- | --- | --- | --- | --- | --- | --- |
| Location of corners of central main groove | Shoulder region | Central region | Central region | Central region | Central region | Central region |
| First angle θ1 (deg.) | 25 | 40 | 25 | 10 | 25 | 25 |
| Second angle θ2 (deg.) | 25 | 40 | 25 | 10 | 25 | 25 |
| Third angle θ3 (deg.) | 65 | 25 | 65 | 65 | 65 | 65 |
| Fourth angle θ4 (deg.) | 35 | 35 | 35 | 35 | 10 | 35 |
| Fifth angle θ5 (deg.) | 35 | 35 | 35 | 35 | 35 | 35 |
| Sixth angle θ6 (deg.) | 35 | 35 | 35 | 35 | 35 | 35 |
| Seventh angle θ7 (deg.) | 15 | 15 | 15 | 15 | 15 | 10 |
| Quick response of handling performance (score) | 100 | 100 | 100 | 109 | 109 | 109 |
| Transient characteristic of handling performance (Index) | 100 | 78 | 122 | 122 | 122 | 122 |

What is claimed is:

1. A motorcycle tire comprising:
a tread portion having a designated rotational direction and an arc-shape outer surface protruding radially outwardly;
the tread portion being provided with a circumferentially and continuously extending central main groove in a zigzag shape, a plurality of first lateral grooves arranged on both sides of the central main groove, a plurality of second lateral grooves arranged on both sides of the central main groove, and a plurality of shoulder grooves arranged on both sides of the central main groove;
the central main groove comprising a plurality of first inclined elements across a tire equator having a first angle with respect to a circumferential direction of the tire, a plurality of second inclined elements across the tire equator having a second angle with respect to the circumferential direction of the tire in an opposite direction to the first inclined elements, and a plurality corners each between one of the first inclined elements and one of the second inclined elements, each corner being located within a crown region that comes into contact with a ground when the tire is mounted on a standard rim with a standard pressure and is loaded with a standard tire load at a camber angle of zero;

each first lateral groove extending axially outwardly toward the rotational direction from one of the corners of the central main groove, the first lateral groove having a third angle with respect to the circumferential direction of the tire, the third angle being greater than or equal to the first and second angles;

each second lateral groove extending axially outwardly toward the rotational direction from one of the first inclined elements or one of the second inclined elements, the second lateral groove being inclined in an opposite direction with respect to the first or second inclined element to which the second lateral groove is connected; and each shoulder groove being disposed outside the crown region and connected to one of the second lateral grooves without being connected to the first lateral grooves, wherein each of the second lateral grooves has a fourth angle with respect to the circumferential direction of the tire, and the third angle is greater than the fourth angle, wherein the difference between the third angle and the fourth angle is at least 30 degrees, wherein the tread portion is further provided with a first connection groove connecting between one of the first lateral grooves and one of the second lateral grooves, wherein the tread portion is further provided with a second connection groove connecting between the central main groove and one of the second lateral grooves, and the second connection groove is disposed so that the first connection groove is continued to the second connection groove through the second lateral groove.

2. The motorcycle tire according to claim 1, wherein the first angle and the second angle are not more than 40 degrees.

3. The motorcycle tire according to claim 1, wherein in a groove centerline of the central main groove, said each corner is located within axially both outermost regions when quartering the crown region in an axial direction of the tire.

4. The motorcycle tire according to claim 1, wherein the third angle is greater than the first angle and the second angle.

5. The motorcycle tire according to claim 1, wherein one of the second lateral grooves is connected to the first or second inclined element on the tire equator.

6. The motorcycle tire according to claim 1, wherein one of the shoulder grooves is inclined axially inwardly toward the rotational direction at an angle of not more than 40 degrees with respect to the circumferential direction of the tire.

7. The motorcycle tire according to claim 1, wherein the first connection groove is inclined axially inwardly toward the rotational direction at an angle of not more than 40 degrees with respect to the circumferential direction of the tire.

8. The motorcycle tire according to claim 1, wherein each of the first lateral grooves comprises an axially outer end located near a tread edge.

9. The motorcycle tire according to claim 1, wherein each of the second lateral grooves comprises an axially outer end located near a tread edge.

* * * * *